United States Patent Office 3,558,720
Patented Jan. 26, 1971

3,558,720
FLUORO-ALKYL-SUBSTITUTED POLYNITRO DIPHENYL ETHERS AND A PROCESS FOR PREPARING THE SAME
Josef J. Schmidt-Collerus, Denver, Colo., Don N. Gray, Towson, Md., and George W. Jordan, Jr., Palo Alto, Calif., assignors to the United States of America as represented by the Secretary of the Air Force
No Drawing. Filed Jan. 28, 1964, Ser. No. 340,833
Int. Cl. C07c 43/28
U.S. Cl. 260—612       7 Claims This invention relates to polynitro diphenyl ethers. More particularly, this invention concerns itself with fluoro-alkyl-substituted polynitro diphenyl ethers and to a process for preparing them. The new diphenyl ether compounds of this invention have the following general formula:

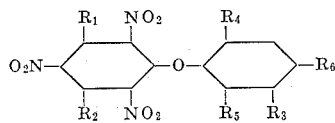

wherein $R_1$, $R_2$ and $R_3$ are similar or dissimilar and each represents a member selected from the group consisting of hydrogen, a monovalent lower alkyl radical having from 1 to 5 carbon atoms, and a fluoro-substituted monovalent lower alkyl radical having from 1 to 5 carbon atoms, provided that at least one of the substituents $R_1$, $R_2$ and $R_3$ is a fluoro-substituted monovalent lower alkyl radical; and $R_4$, $R_5$ and $R_6$ are similar and each represents a member selected from the group consisting of hydrogen and a nitro radical.

Illustrative of the lower alkyl and fluoro-substituted lower alkyl radicals represented by $R_1$, $R_2$ and $R_4$ are the following:

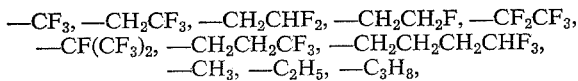

or other monovalent lower alkyl and fluorine-containing lower alkyl radicals either straight chained or branched in structure.

It has been found that the compounds of this invention are especially valuable when utilized as primary explosives, propellants and propellant additives, boosters, detonating fuses, etc.

It is the primary object of this invention to provide a new class of explosives:

Another object of this invention is to provide a new class of polynitro diphenyl ethers.

Still a further object of this invention is to provide a new class of fluoro-alkyl-substituted polynitro diphenyl ethers.

Still a further object of this invention is to provide a process for synthesizing the new compounds.

The novel diphenyl compounds of this invention are prepared by effecting a reaction between an equimolar mixture of (1) a substituted picryl chloride having the following general formula:

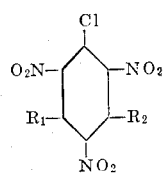

wherein $R_1$ and $R_2$ have the same meaning as previously assigned to them and (2) a monohydric phenol having the following general formula:

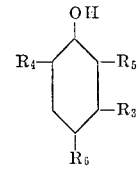

wherein $R_3$, $R_4$, $R_5$ and $R_6$ have the same meaning as previously assigned to them.

The aforementioned reaction is accomplished by dissolving the reactants in a neutral solvent, such as ethanol, in the presence of a basic catalyst. The catalyst may be sodium carbonate, sodium bicarbonate, sodium hydroxide or some other basic material capable of neutralizing the hydrogen chloride formed during the reaction. The phenol reactant may be either nitro or fluoro-alkyl-substituted, or both; and the picryl chloride may be either alkyl or fluoro-alkyl-substituted, or both. It is necessary, however, that at least one of the reactants be substituted in such a fashion that the diphenyl ether reaction product contain at least one fluoro-alkyl group.

The following examples illustrate the new diphenyl ether compounds of this invention and the manner in which they are prepared. These examples are presented to illustrate specific embodiments of the invention and are not to be construed as limiting the scope thereof in any way.

EXAMPLE 1

A mixture of 4.7 g. (0.05 mole) of phenol, 15.7 g. (0.05 mole) of 3-chloro-2,4,6-trinitrobenzotrifluoride and 200 ml. of a 1% solution of sodium hydroxide in ethanol was refluxed for one hour, then cooled and poured onto about 500 g. of crushed ice. The yellow precipitate which formed was filtered and subsequently recrystallized from 95% ethanol to give 14.3 g. of 2,4,6-trinitro-3-trifluoromethylphenyl phenyl ether as nearly-white crystals; M.P. 132° C. The yield was 77%.

EXAMPLE 2

To a solution of 200 ml. of 1% sodium hydroxide in ethanol and 8.1 g. (0.05 mole) of 3-hydroxybenzotrifluoride was added 13.02 g. (0.05 mole) of 3-chloro-2,4,6-trinitro toluene. A spontaneous reaction occurred with the evolution of considerable heat. After the solution had cooled at room temperature, it was poured onto ice, filtered and dried. The product, 2,4,6-trinitro-3-methylphenyl-2',4',6' - trinitro-3' - trifluoromethylphenyl ether, was obtained as a slightly-yellow solid which melted between 90 to 100° C. with decomposition. The melting point did not change after several recrystallizations from 95% ethanol. A total of 9.6 g. was obtained giving a 49% yield.

EXAMPLE 3

A solution of 11.4 g. (0.05 mole) of picric acid in 100 ml. of ethanol was neutralized with a solution of 1% sodium hydroxide in 95% ethanol. After allowing the solution to cool from the heat of neutralization, 15.7 g. (0.05 mole) of 3-chloro-2,4,6-trinitrobenzotrifluoride dissolved in 50 ml. of ethanol was added slowly with cooling (ice bath). The mixture was warmed to room temperature and then refluxed on a steam bath for six hours to insure complete reaction. The mixture was poured onto crushed ice and filtered. The 2,4,6-trinitrophenyl- 2'4', 6'-trinitro-3'-trifluoromethylphenyl ether reaction product was obtained as white crystals; M.P. 175° C. A total of 18.2 g. was obtained giving a 72% yield.

EXAMPLE 4

Di(2,4,6-trinitro-3 - trifluoromethylphenyl) ether was prepared by a method similar to Example 3 with the substitution of 14.8 g. (0.05 mole) of 3-hydroxy-2,4,6-trinitrobenzotrifluoride for the picric acid. The yield was 22.0 g. (76%) of a slightly-yellow product which retained its color after recrystallization. Crystallization indicated that there were two products from this reaction. The first product crystallized quite readily from 95% ethanol, and had a melting point of 184° C. After the mother liquor had remained at zero to 15° C. for several hours, a second product was crystallized from solution which melted at 134° C. The 76% yield given is the total yield for both of these compounds. These two compounds could be isomeric forms due to hindered rotation around the ether linkage in the substituted diphenyl ether molecule.

EXAMPLE 5

The preparation of 2,4,6-trinitro-3-methylphenyl-2',4',6'-trinitro-3'-trifluoromethylphenyl ether was carried out in a manner similar to that described in Example 4 but using 0.05 mole quantities each of 3-chloro-2,4,6-trinitro toluene and 3-hydroxy-2,4,6-trinitrobenzotrifluoride. The yield was 12.5 g. (53%) of a light-tan material; M.P. 146° C.

From an examination of the foregoing, it will be seen that the present invention provides for a new class of polynitro diphenyl ether compounds which have been found to be especially useful when employed in explosive applications. These compounds exhibit a high explosive potential together with a minimum susceptibility to shock and heat.

It will be understood by those skilled in the art to which the present invention pertains that while the compounds disclosed herein illustrate preferred embodiments of the invention, various modifications and alterations may be made without departing from the spirit and scope thereof, and that all such modifications as fall within the scope of the appended claims are intended to be included herein.

What is claimed is:

1. The compounds having the formula:

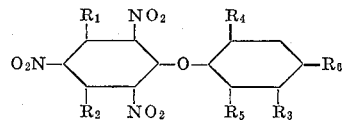

wherein $R_1$, $R_2$ and $R_3$ each represent a member selected from the group consisting of hydrogen, a monovalent lower alkyl radical, and a fluoro-substituted monovalent lower alkyl radical provided that at least one of the substituents $R_1$, $R_2$ and $R_3$ is a fluoro-substituted monovalent lower alkyl radical; and $R_4$, $R_5$ and $R_6$ each represent a member selected from the group consisting of hydrogen and a nitro radical.

2. 2,4,6-trinitro-3-trifluoromethylphenyl phenyl ether.
3. 2,4,6-trinitro-3-methylphenyl - 3' - trifluoromethylphenyl ether.
4. 2,4,6 - trinitrophenyl - 2',4',6' - trinitro - 3' - trifluoromethylphenyl ether.
5. Di(2,4,6 - trinitro - 3-trifluoromethylphenyl) ether.
6. 2,4,6-trinitro-3-methylphenyl-2',4',6' - trinitro - 3'-trifluoromethylphenyl ether.
7. A process for preparing a fluoro-alkyl-substituted polynitro diphenyl ether which comprises dissolving a mixture of (1) a substituted picryl chloride having the general formula:

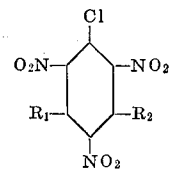

and (2) a monohydric phenol having the general formula:

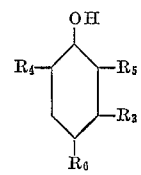

wherein $R_1$, $R_2$ and $R_3$ each represent a member selected from the group consisting of hydrogen, a monovalent lower alkyl radical, and a fluoro-substituted monovalent lower alkyl radical provided that at least one of the substituents $R_1$, $R_2$ and $R_3$ is a fluoro-substituted monovalent lower alkyl radical; and $R_4$, $R_5$ and $R_6$ each represent a member selected from the group consisting of hydrogen and a nitro radical in a neutral solvent in the presence of a basic catalyst thereby effecting a reaction between (1) and (2), allowing the said reaction to come to completion, and recovering a fluoro-alkyl-substituted polynitro diphenyl ether reaction product from the reaction mixture.

References Cited

UNITED STATES PATENTS 3,418,372   12/1968   Taylor _____ 149—105X

LELAND A. SEBASTIAN, Primary Examiner

U.S. Cl. X.R.

149—105